United States Patent
Mechaley, Jr.

(10) Patent No.: US 8,464,324 B2
(45) Date of Patent: Jun. 11, 2013

(54) SYSTEM AND METHOD FOR IDENTITY VERIFICATION ON A COMPUTER

(75) Inventor: Robert G. Mechaley, Jr., Kirkland, WA (US)

(73) Assignee: MobileSphere Holdings LLC, Kirkland, WA (US)

( * ) Notice: Subject to any disclaimer, the term of this patent is extended or adjusted under 35 U.S.C. 154(b) by 181 days.

(21) Appl. No.: 12/961,392

(22) Filed: Dec. 6, 2010

(65) Prior Publication Data

US 2012/0144458 A1 Jun. 7, 2012

(51) Int. Cl.
- *H04L 29/06* (2006.01)
- *H04L 9/32* (2006.01)
- *G06F 21/00* (2006.01)
- *G06F 7/04* (2006.01)

(52) U.S. Cl.
USPC ........... 726/5; 726/26; 713/153; 713/165; 713/168; 713/183; 713/184

(58) Field of Classification Search
USPC ......... 726/5, 26; 713/153, 165, 168, 182–184
See application file for complete search history.

(56) References Cited

U.S. PATENT DOCUMENTS

| | | | |
|---|---|---|---|
| 2008/0013832 A1 | 1/2008 | Lev | |
| 2009/0265776 A1* | 10/2009 | Baentsch et al. | 726/9 |
| 2009/0288159 A1* | 11/2009 | Husemann et al. | 726/16 |
| 2010/0125509 A1 | 5/2010 | Kranzley et al. | |
| 2010/0275010 A1* | 10/2010 | Ghirardi | 713/155 |
| 2012/0084571 A1* | 4/2012 | Weis et al. | 713/184 |

* cited by examiner

*Primary Examiner* — Aravind Moorthy
(74) *Attorney, Agent, or Firm* — Michael J. Donohue; Davis Wright Tremaine LLP

(57) ABSTRACT

A system to verify user identity on a computer uses a server with a set of stored or created images. An image is selected and transmitted over a computer network to the computer whose user identity is to be verified. The user captures the image on a mobile communication device using, by way of example, a built-in camera. The captured image is transmitted via a public mobile network back to the server where the captured image is compared with the stored image. If the images match, the user identity is verified. In another embodiment, multiple images may be displayed and user-selectable options are selected by capturing one of the multiple images.

38 Claims, 5 Drawing Sheets

SYSTEM AND METHOD FOR IDENTITY VERIFICATION ON A COMPUTER

BACKGROUND OF THE INVENTION

1. Field of the Invention

The present disclosure is related generally to techniques for user identity verification on a computer, and more particularly, to a system and method for using captured images to verify user identity.

2. Description of the Related Art

The verification of user identity on a computer is sometimes a simple task. The computer coupled to a computer network typically has a media access control (MAC) address that does not change. If the user is operating from a private computer, such as a computer at home or at the office, there is some assurance of the identity of that user. However, it is sometimes desirable to provide independent verification of the user identity even in these circumstances.

In addition, computers in a public area, such as a library, hotel lobby, or the like, accommodate many users whose identities are unknown. The use of such a public computer often leads to the inadvertent disclosure of confidential information. Under these circumstances, it is desirable to verify the identity of the user before accepting data from the computer. For example, a user may access a bank account using a public computer. If data is inadvertently left on the public computer, an unscrupulous individual may be able to access the bank account.

Therefore, it can be appreciated that there is a significant need for a technique to verify user identity on a computer. The present disclosure provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The present disclosure is directed to techniques for verifying the identity of the user on a computer. As discussed above, this is particularly important when the computer is a publically accessible computer, but is readily applicable to any computer. Even on a private computer, the techniques discussed herein could be used, for example, to replace the conventional user log-in operation. As will be described in detail below, one portion of the identity verification system stores a plurality of images, or can create images dynamically. The image is transmitted via a conventional computer network to the computer in question where the image is displayed on the computer display. The user whose identity is to be verified captures the displayed image using a camera, or other imaging device, common to many mobile communication devices (e.g., a cell phone, smart phone, PDA, or the like). The mobile communication device transmits the captured image via the mobile communication network to which it is coupled. The image is relayed back to the server where the captured image is compared with the original image. If the images match to a specified degree, the user's identity has been verified.

Figure 1:
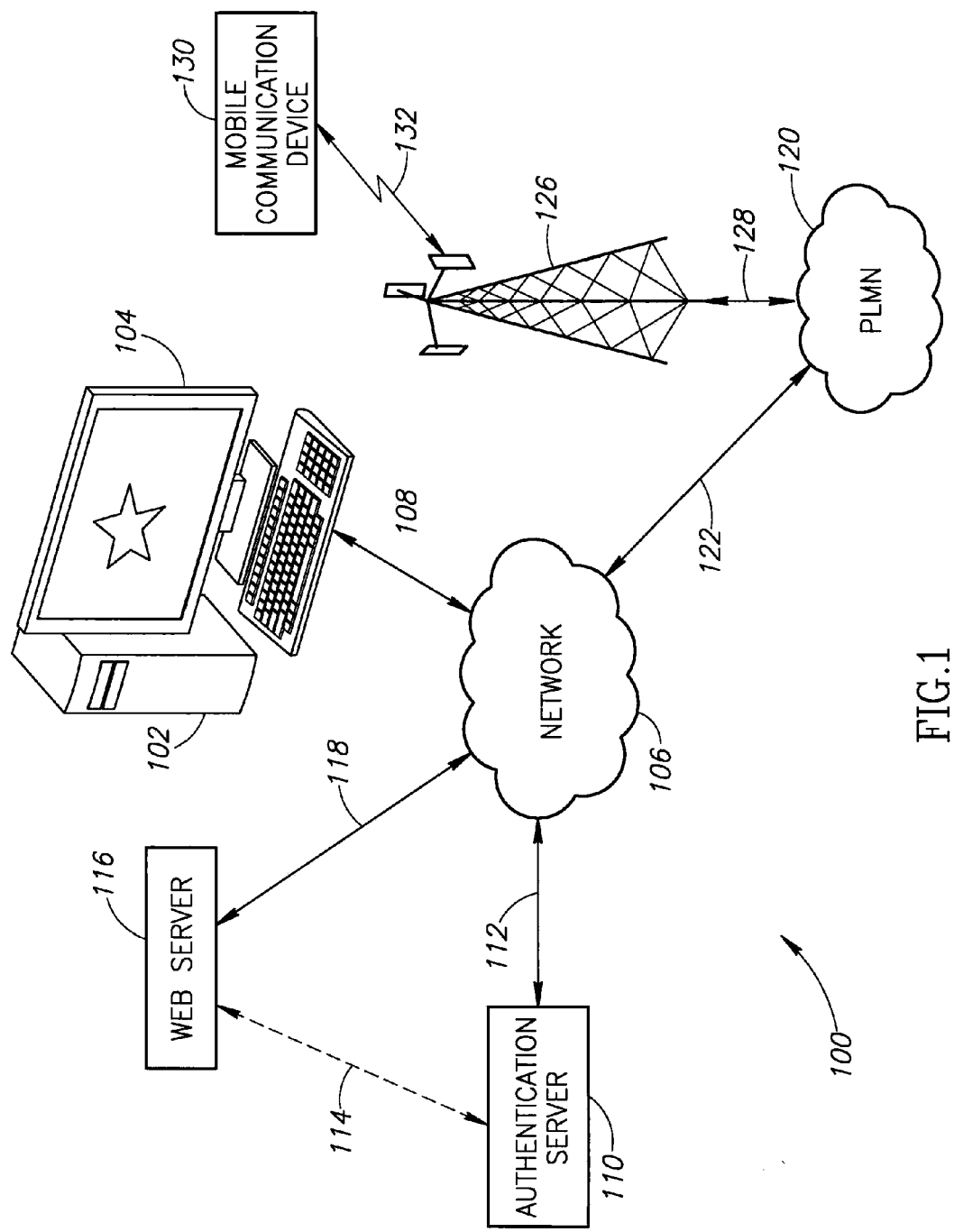
FIG. 1 illustrates an exemplary embodiment of a system architecture configured in accordance with the present disclosure.

The present disclosure is embodied, in one example, in a system 100 illustrated in FIG. 1. A computer 102 having a display 104 is coupled to a network 106, such as the Internet, via a communication link 108. The system 100 provides a technique to verify the identity of a user of the computer 102. As discussed above, the computer 102 may be a private computer (i.e. an individual's personal computer) or a public computer (e.g. in a library or hotel lobby). Furthermore, although the computer 102 is illustrated as a personal computer, those skilled in the art will appreciate that the principles of the system 100 are applicable to any computing device capable of rendering images, such as an automated teller machine (ATM), point-of-sales (POS) terminal, or the like. Thus, the system 100 is not limited to a particular form of computing device.

The system 100 includes an authentication server 110 coupled to the network 106 via a communication link 112. Operational details of the authentication server 110 are provided below.

A web server 116 is coupled to the network via a communication link 118. As will be described in greater detail below, the web server 116 may initiate the authentication process. For example, the web server 116 could host a website for on-line purchases. Alternatively, the web server 116 may host the website for a bank or other financial institution. In yet another alternative embodiment, the web server 116 may host a secure website, such as a business, law firm, or the like. In this embodiment, the web server 116 effectively acts as a gateway and may provide access to a secure local area network (LAN). If the computer 102 wishes to access the web server 116, the web server initiates the authentication process of the system 100. Although discussed herein as a "web server," for ease in understanding, the web server 116 can be implemented as any server capable of causing an image to be displayed on the display 104 of the computer 102.

In an exemplary embodiment, the authentication server 110 and web server 116 are both coupled to the network via the communication links 112 and 118, respectively. In this embodiment the system 100 is implemented as a distributed system, and the authentication server 110 can provide security services for a number of unrelated web servers 166. In an alternative embodiment, the authentication server 110 and the web server 116 may be coupled together by a link 114. The link 114 could represent a local area network (LAN) that handles communication between the authentication server 110 and the web server 116 instead of communication via the network 110. In this embodiment, a number of web servers 116 may be owned by a single entity and a LAN link 114 could provide greater security.

In yet another alternative embodiment, the authentication server 110 could be implemented as a portion of the web server 116 (or vice versa). In this embodiment, the link 114 could represent an internal bus connecting the different server portions. In this embodiment a single integrated authentication server 110/web server 116 could provide identity authentication for a number of computers 102. For example, a number of computers 102 could represent a plurality of point-of-sales (POS) terminals in a large retail facility. The retail facility could have a single integrated authentication server 110/web server 116 to provide authentication services for the entire retail facility.

The alternative system architectures described above are intended merely to illustrate different forms of implementation and communication pathways. The system 100 is not limited to any particular architecture or implementation described in the examples (e.g., distributed network, LAN or integrated operation).

The system 100 utilizes a mobile communication network, such as a public land mobile network (PLMN) 120 coupled to the network 106 via a communication link 122. Those skilled in the art will appreciate that the communication links 108, 112, 118, and 122 may be implemented in many different forms, including hard wired, fiberoptic, microwave, wireless, or the like. For example, the communication link 108 connecting the computer 102 to the network 106 may be implemented using a dial-up modem, cable modem, satellite connection, wireless network, or the like. The system 100 may be satisfactorily implemented by one or more of these technologies, alone or in combination, for the communication links 108, 112, 118, and 122. The system 100 is not limited by the specific form of these communication links.

A base station 126 is coupled to the PLMN 120 via a backhaul communication link 128. Those skilled in the art will appreciate that a typical wireless communication network, such as the PLMN 120, include a large number of base stations. However, for the sake of clarity, FIG. 1 illustrates only the base station 126.

A mobile communication device 130 is coupled to and in communication with the base station 126 via a wireless link 132. The mobile communication network, including the PLMN 120, base station 126, and mobile communication device 130 are illustrated in FIG. 1 as a generic wireless communication system. Those skilled in the art will appreciate that the elements of FIG. 1 that make up the wireless network may be implemented in accordance with any known wireless communication system. For example, the PLMN 120, base station 126 and mobile communication device 130 may be implemented in accordance with any known communication protocol, such as GSM, CDMA, WiFi, WiMAX, 3G, 4G, LTE, or the like. Operational details of these various communication protocols are known in the art and need not be described in greater detail herein.

As will be described in greater detail below, the authentication server 110 transmits an image to the computer 102 via the network 106. The image is shown on the display 104. To verify identity, the user snaps a picture of the image on the display 104 using an imaging capability in the mobile communication device 130, such as a camera. The image captured by the mobile communication device 130 is transmitted to the PLMN 120 and relayed back to the authentication server 110. Image comparison technology within the authentication server compares the captured image from the display 104 to the original image transmitted from the authentication server. If the images match to a sufficient degree, the user identity is verified by virtue of the user identification associated with the mobile communication device 130.

Figure 2:
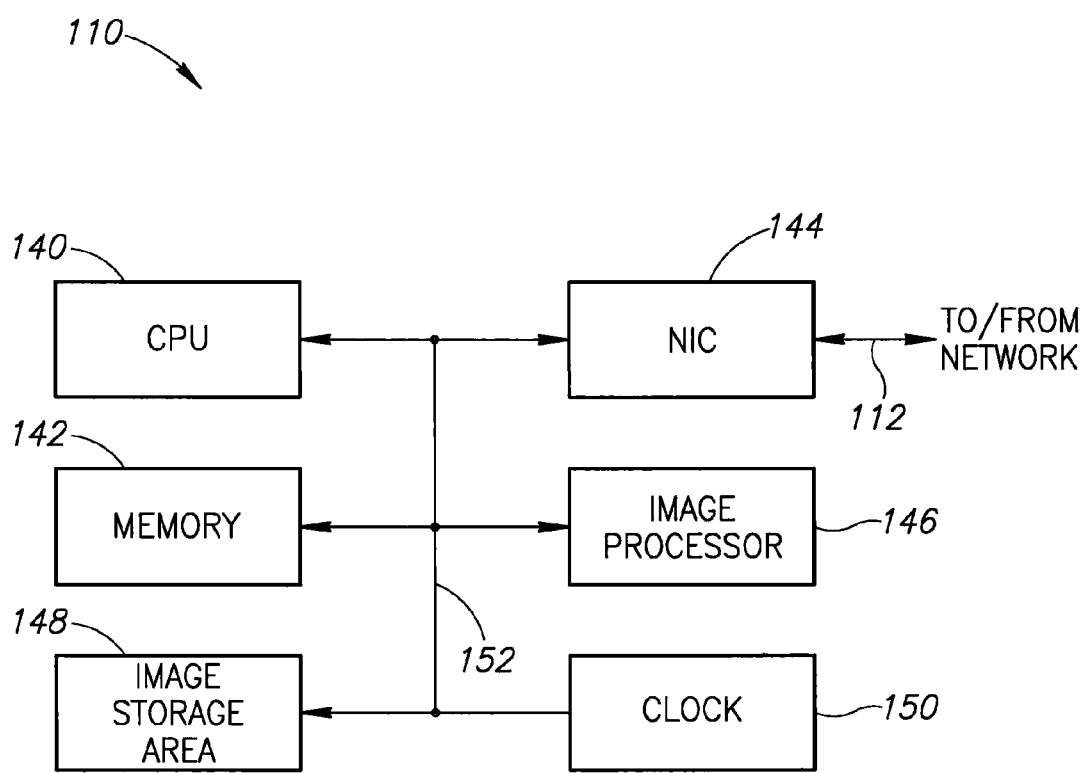
FIG. 2 is a functional block diagram of a server of FIG. 1.

FIG. 2 is a functional block diagram of the authentication server 110. The authentication server 110 includes a central processing unit (CPU) 140 and a memory 142. In general, the memory 142 contains data and instructions that are executed by the CPU 140. The CPU 140 may be implemented as a conventional microprocessor, microcontroller, digital signal processor, application specific integrated circuit, or the like. The authentication server 110 is not limited by the specific implementation of the CPU 140.

Similarly, the memory 142 may be implemented with a variety of known technologies. The memory 142 may include random access memory, read-only memory, programmable memory, and the like. In one embodiment, a portion of the memory 142 may be integrated into the CPU 140. The authentication server 110 is not limited by the specific form of the memory 142.

FIG. 2 also illustrates a network interface controller (NIC) 144. The NIC 144 generically represents the interface between the authentication server 110 and the network 106. The specific implementation of the NIC 144 depends on the particular interface type and is within the scope of knowledge of one of ordinary skill in the art. For example, the NIC 144 may be an ether net interface coupled to a network access point (not shown). Alternatively, the NIC 144 may be a wireless interface or other known form of interface depending on the nature of the communication link 112 between the authentication server 110 and the network 106. The authentication server 110 is not limited by the specific implementation of the NIC 144.

The authentication controller 110 also includes an image processor 146 and an image storage area 148. As will be described in greater detail below, the image processor 146 may be used in one embodiment to generate images for transmission to the computer 102 (see FIG. 1). If the image processor 146 generates the image for transmission to the computer 102, a copy of the image is temporarily stored in the image storage area 148 for later comparison with a captured image. As described above, the user captures the image on the display 104 and transmits it, via the PLMN 120 and the network 106, to the authentication server 110. The image processor 146 compares the captured image with the generated image to determine if they match.

Alternatively, the system 100 may use a plurality of images either previously generated by the image processor 146 or obtained from an external source. The images may be conventional images, such as photographs, drawings, or the like. The images may be realistic (e.g. the Lincoln Memorial) or abstract designs. The plurality of images, of any nature, are stored in the image storage area 148. While FIG. 2 illustrates the image storage area 148 as part of the authentication server 110, the image storage area could be in a separate location and coupled to the authentication server via a network connection in a local area network or a wide area network, such as the Internet.

In operation, the image processor 146 may randomly select one of the stored images in the image storage area 148 for transmission to the computer 102. As described above, the mobile communication device 130 captures the select image on the display 104 and transmits the captured image back to the authentication server via the PLMN 120 and the network 106. The image processor compares the captured images from the display 104 with the selected image from the image storage area 148 to determine if there is a match.

In yet another embodiment, the user may preselect an image from among the plurality of images stored in the image storage area 148. In this embodiment, the image processor 146 transmits the user-selected image from the image storage area 148 to the computer 102. In this manner, the user has some assurance that the authentication server 110 is valid and not the result of phishing of, for example, a website associated with the authentication server. In this embodiment, the mobile communication device 130 captures the user-selected image on the display 104 and transmits the captured image to the authentication server 110 via the PLMN 120 and network 106 as previously described. The image processor 146 analyzes the captured user-selected image and the stored user-selected image to determine if a match exists. Other alternative embodiments are discussed below.

FIG. 2 also illustrates a clock 150. As will be described in greater detail below, the image processor 146 can use the clock 150 to generate a time of day or date stamp when generating an image or when selecting an image from the image storage area 148. The date stamp can be used to make sure that the image is current. That is, the image is only valid for a predetermined period of time. Old images may be deleted by the image processor 146 on the basis of the date stamp.

The various components of FIG. 2 are coupled together by a bus system 152. The bus system 152 may comprise an address bus, data bus, control bus, power bus, and the like. For the sake of clarity, those various buses are illustrated in FIG. 2 as the bus system 152.

Those skilled in the art will appreciate that some of the functional blocks in FIG. 2 may be implemented as a set of instructions stored in the memory 142 and executed by the CPU 140. For example, the image processor 146 can be implemented as a separate device (e.g. a digital signal processor) or implemented as a set of instructions stored in the memory 142. Because the image processor 146 performs a separate function, it is illustrated as a separate block in the functional block diagram of FIG. 2.

Similarly, the image storage area 148 may be implemented as a separate storage component or integrated into the memory 142. The image storage area 148 may be implemented as any suitable data structure. In one embodiment, the image storage area 148 may be implemented as a database that may be an integral part of the authentication server 110 or implemented as a separate component coupled to the authentication processor 110. For example, the image storage area 148 may be coupled to the authentication server via a local area network (LAN). In a distributed computer network, the image storage area 148 may be coupled to the network 106 and in communication with the authentication server 110 via the network.

The mobile communication device 130 performs a number of functions. First, it takes a picture of an image displayed on the display 104 of the computer 102. Secondly, it provides a file name for the captured image. In an exemplary embodiment, the file name of the image may include the IMSI of the mobile communication device 130 and a time stamp indicating the time at which the image was captured. In addition, the mobile communication device 130 sends the captured image to a predefined address. The mobile communication device 130 executes a simple application program that allows the capture of an image and the automatic transfer of the captured image, via the PLMN 120, to a URL associated with the authentication server 110. Finally, the mobile communication device 130 provides dialog with the user to assist in the image capture process. As noted above, this may include providing guidance on how to take the "best picture to thereby increase the probability of determining a match.

Figure 3:
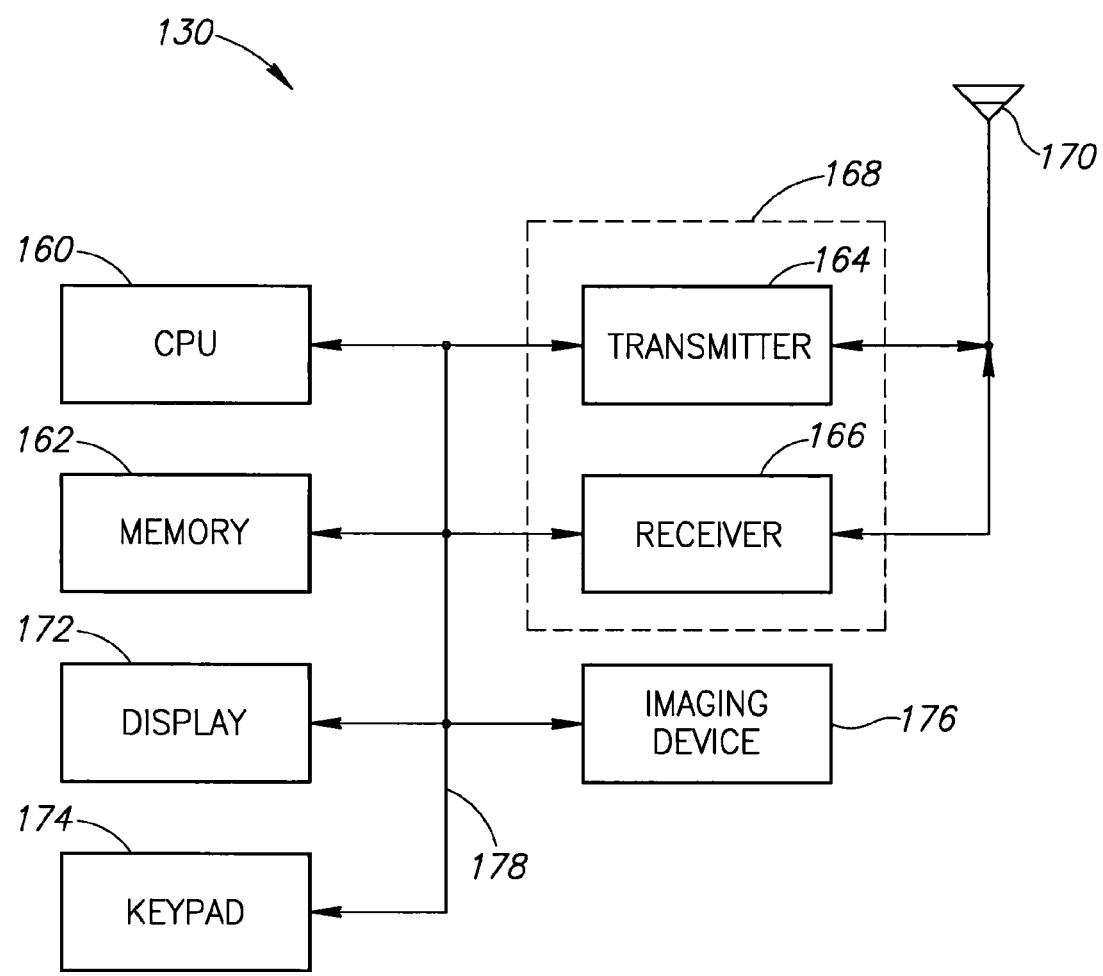
FIG. 3 is a functional block diagram of a mobile communication device operating in accordance with the present disclosure.

FIG. 3 is a functional block diagram of the mobile communication device 130. The mobile communication device 130 includes a CPU 160 and memory 162. In general, the memory 162 contains data and instructions that are executed by the CPU 160. The CPU 160 may be implemented as a conventional microprocessor, microcontroller, digital signal processor, application specific integrated circuit, or the like. The mobile communication device 130 is not limited by the specific implementation of the CPU 160.

Similarly, the memory 162 may be implemented with a variety of known technologies. The memory 162 may include random access memory, read-only memory, programmable memory, and the like. In one embodiment, a portion of the memory 162 may be integrated into the CPU 160. The mobile communication device 130 is not limited by the specific form of the memory 152.

FIG. 3 also illustrates a transmitter 164 and a receiver 166. In many implementations, the transmitter 164 and receiver 166 share common circuitry and are implemented as a transceiver 168. The transceiver 168 is coupled to an antenna 170. The transceiver 168 is illustrated in FIG. 3 as a generic device. Those skilled in the art will appreciate that the specific implementation of the transceiver 168 may depend on the particular PLMN 120 with which the mobile communication device 130 communicates. For example, the transceiver 168 in one mobile communication device 130 may be configured for operation in accordance with GSM standards while the transceiver 168 in a different mobile communication device may be configured for operation in accordance with CDMA or other communication protocols. However, as noted above, the system 100 may be readily implemented on mobile networks using various communication protocols and is not limited to any particular communication protocol.

In addition, the mobile communication device 130 includes a display 172 and keypad 174. The display 172 may be a black and white or color display and, in some embodiments, may be a touch-sensitive display. In this embodiment, the functionality of the keypad 174 may be combined with the display 172. These input/output devices operate in a conventional manner and need no further explanation regarding operational details.

FIG. 3 also illustrates an imaging device 176. The imaging device 176 may include a charge-coupled device and a lens (not shown), as is common in many wireless devices. Technical details of the imaging device 176 to capture an image are well known in the art, and need not be described in greater detail herein.

The various components in FIG. 3 are coupled together by a bus system 178. The bus system 178 may include an address bus, data bus, control bus, power bus, and the like. For the sake of clarity, those various buses are illustrated in FIG. 3 as the bus system 178.

Figure 4:
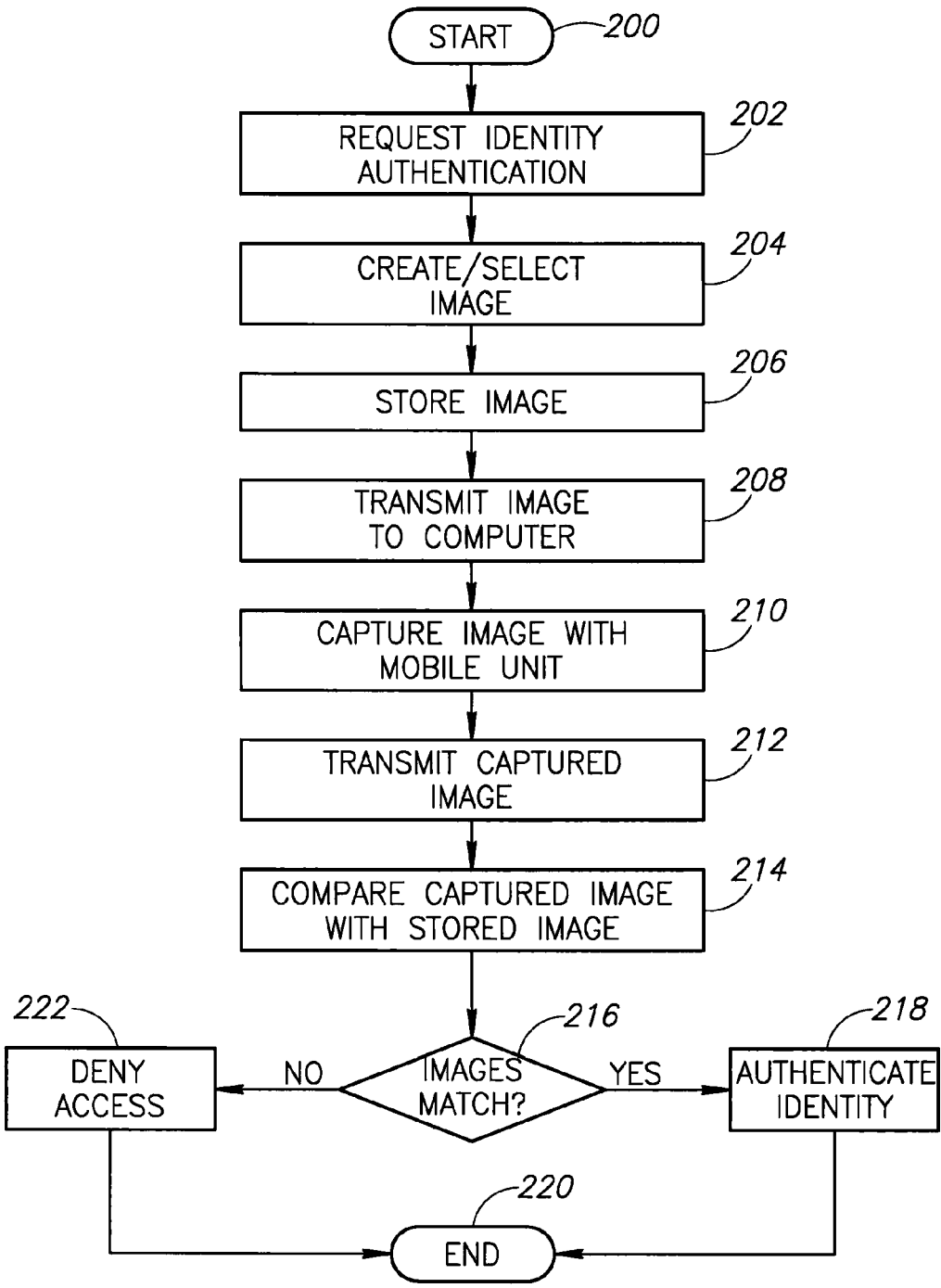
FIG. 4 is a flow chart illustrating the operation of the embodiment of FIG. 1.

FIG. 4 is a flow chart illustrating the operation of an exemplary embodiment of the system 100. At a start 200, the system illustrated in FIG. 1 is operational. At step 202 an identity authentication request is generated. The request is typically generated by the web server 116 (see FIG. 1) that the computer 102 wishes to access. In response to the access request from the computer 102, the web server 116 sends an authentication request to the authentication server 110.

The identity authentication request will include a request for an image. In an exemplary embodiment, the user provides log-in information that allows the web server 116 or the authentication server 110 to associate that user with the mobile communication device 130. In one embodiment, the user password may be the mobile telephone number or other data, such as the international mobile subscriber identity (IMSI), used in GSM communication systems, or equivalent identification, such as an electronic serial number (ESN) commonly used in CDMA communication systems. Thus, at the initial log-in attempt, the web server has information identifying both the computer 102 and the mobile communication device 130. Alternatively, the user may provide a more conventional user name that does not include any data associated with the mobile communication device. In this embodiment, either the web server 116 or the authentication server 110 must contain data linking the user name with the mobile communication device 130. If the web server 116 contains this association data, the web server 116 transmits the association for the mobile communication device 130 to the authentication server 110 when requesting an image.

In step 204, the image processor 146 (see FIG. 2) of the authentication server 110 creates an image or selects an image from the image storage area 148. In an exemplary embodiment, the image may be created as a .PNG, .GIF, .JPG, or the like. In an exemplary embodiment, the image may be created as a .PNG image over approximately 60×60 pixels. The image may be in color or in black and white.

As described above, the image may be a photograph or likeness of a well-known object that may be selected from the image storage area 148 or a fanciful image generated by the image processor 146 (see FIG. 2) that may contain lines, dots, geometric shapes, or the like. In this embodiment, there is no particular meaning to the content of the image. Instead, the content is chosen for ease of matching the generated image with the captured image on the wireless communication device 130. More complex images, such as fractals, may also be used. The system 100 is not limited by the specific type of image. Simple graphical images, such as those described above, may provide a simplified match process. However, more complex processing power may be available and the images may be correspondingly complex.

In step 206, the image is stored in the image storage area 148 in association with the mobile communication device 130. As discussed above, the authentication server 110 has data related to the identity of the mobile communication device 130. This may include, for example, the mobile telephone number, the IMSI, a temporary mobile subscriber identity (TMSI), ESN, or the like. The image may also be stored with a time stamp to provide the image with an effective "expiration time."

In step 208, the image is transmitted from the authentication server 110 (see FIG. 1) to the computer 102 via the network 106. Although the image could be transmitted from the authentication server 110 directly to the computer 102, a more common practice is for the web server 116 to provide a link to the image location in the image storage area 148. As those skilled in the art will appreciate, a web page often contains links to other sources of images and/or text. When the computer 102 wishes to access the web server 116, it typically navigates to a log-in page on the web server. As described above, the computer 102 provides the user name that may include data identifying the mobile communication device 130 or password data that may be used by the web server 116 or the authentication server 110 to identify the mobile communication device 130. When the user name is received by the web server 116, it generates a request to the authentication server 110 for an image. In an exemplary embodiment, the web server 116 also creates a space for the image and creates a filename for the image. The information passed from the web server 116 to the authentication server 110 includes the file name data. The authentication server 110 creates the image and stores it in the image storage area 148 (see FIG. 2) using the filename provided by the web server 116. When the image is created, the link in the log-in page of the web server 116 displays the image. The computer 102, in turn, renders the image on the display 104. The process of providing links to images in a web page and rendering images is well known and need not be described in greater detail herein.

In step 210, a user captures the image on the display 104 using the imaging device 176 (see FIG. 3) of the mobile communication device 130. Application software within the mobile communication device 130 may provide guidance or instructions to the user to assist in the capture of an optimal quality image. The application software generates the captured image and a time stamp indicating the time at which the image was captured on the display 104. The captured image is also associated with the IMSI or other subscriber identifier for the mobile communication device 130. In step 212, the captured image, identifier, and time stamp are transmitted from the mobile communication device 130 to the authentication server 110 using the base station 126, PLMN 120, and the network 106.

In step 214, the image processor 146 (see FIG. 2) of the authentication server 110 compares the captured image transmitted from the mobile communication device 130 (see FIG. 1) with the stored image in the image storage area 148 (see FIG. 2). The image processor 146 can use known image analysis techniques to compare the captured image with the stored image.

If the captured image matches the stored image, the images match and the result of decision 216 is YES. In that event, the authentication server 110 (see FIG. 1) authenticates the identity of the user of the mobile communication device 130 in step 218. An authentication message may be transmitted from the authentication server 110 to the web server 116 to indicate a match and the process ends at 220. If the images do not match, the result of decision 216 is NO and, in step 222, the authentication server 110 denies access. An access denied message (i.e., a "no match" message) may be sent from the authentication server 110 to the web server 116 and the process ends at 220. The process ends at 220 with the mobile communication device 130 being authenticated and allowing the computer 102 to access the web server 116 or with access to the web serving being denied if the images do not match.

In some cases, the authentication server 110 may send a message to the computer 102 if the file is corrupt, or the like, and prompt the user to retake a photograph of the image displayed on the display 104 of the computer 102.

The time stamp discussed above may also play a role in the authentication process. A time stamp is attached to the image when it is stored in the image storage area 148 and transmitted to the computer 102. In one exemplary embodiment, the time stamp can be used to assure that the image transmitted by the authentication server 110 is quickly shown on the display 104. The mobile communication device 130 generates a time stamp when it captures and transmits the image on the display 104 of the computer 102. In this embodiment, the time stamp of the captured image must be within a short time (e.g., 30 seconds) of the time stamp generated by the authentication server when the image was created and transmitted from the authentication server. Alternatively, the authentication server may continue to recognize the computer 102 for some predetermined period of time so that a user may navigate from one web server 116 to another web server without having to log in each time. In this example embodiment, the captured image may be valid for authentication purposes for a longer period of time (e.g., 30 minutes). In these embodiments, the authentication server 110 compares the captured image with the stored image in step 214 of FIG. 4 and also compares the time stamp on the captured image with the time stamp on the stored image to make sure they are within the selected time constraints.

The system 100 described above provides a unique security system based on the real-time presentation of an image on the display 104 of the computer 102 and capturing of that image by the mobile communication device 130. As previously discussed, the image may be valid for a predetermined period of time, such as, by way of example, 30-60 minutes. Alternatively, the image may be valid only for a single log-in-operation. That is, the image is valid only until the user of the computer 102 has completed the log-in process.

With the system 100, an individual can use the IMSI or other identifier as a user name and the image on the display 104 becomes the password. For example, a user may log into a social network using a single identity (i.e., the phone number) but have no password. This provides a greater degree of security since no passwords needs to be stored in the mobile communication device 130 or in the computer 102. The social network website (i.e., the web server 116) requests an image and the authentication server 110 operates in the manner described above to authenticate the user using a dynamically generated or selected image rather than a static password.

In an exemplary embodiment, the authentication server 110 may serve as a central repository for web transactions. In this embodiment, a user may shop at a number of different websites. In this embodiment, the user may navigate from one web server 116 to another without requiring an additional log-in process. For example, the identity authentication process described above may be valid for, by way of example, 60 minutes, to allow the user of the computer 102 to navigate to multiple web servers.

In the embodiment described above, the image on the display 104 may be used for identity authentication in a log-in process. However, the image authentication system can be used for other purposes as well.

Figure 5:
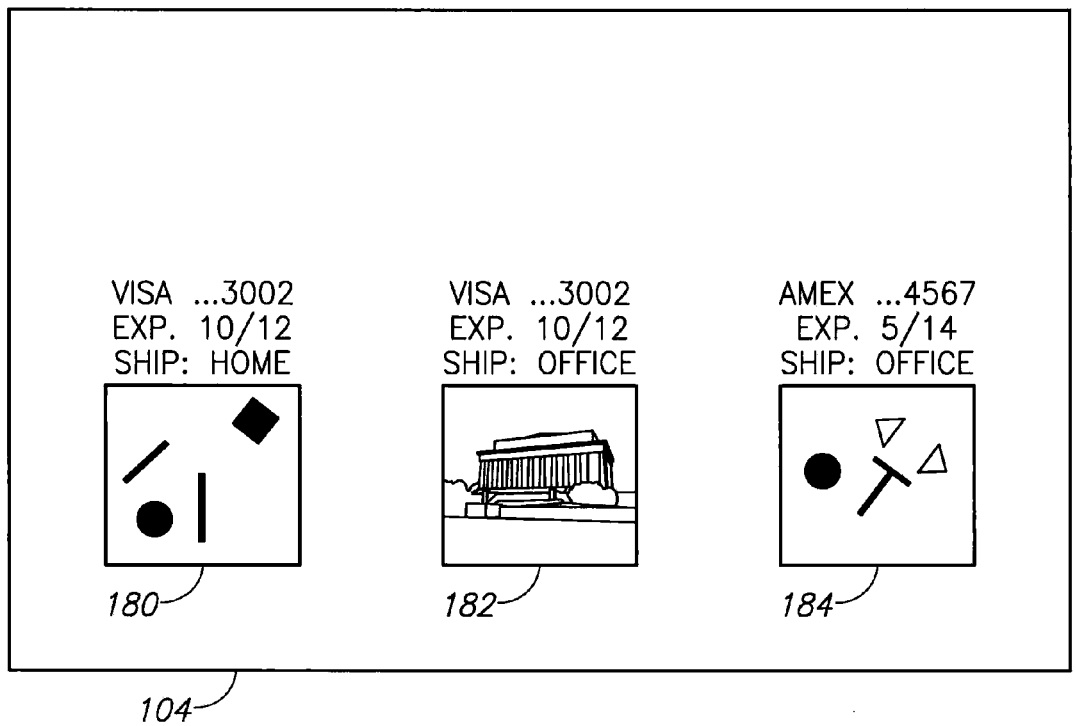
FIG. 5 illustrates the display of multiple images to provide multiple functions.

In another aspect, the system 100 may provide for the display of multiple images on the display 104 of the computer 102 wherein each image represents a different function with the authentication server 110. FIG. 5 illustrates images 180-184 generated by the authentication server 110 (see FIG. 1) and transmitted to the computer 102 in the manner described above. In addition to the identity authentication process described above, the images 180-184 can provide a simple means for user selection of options. In the example of FIG. 5, the user must already have credit card numbers and shipping addresses on file with the web server 116 and/or the authentication server 110. For example, if the web server 116 is an on-line shopping website, the user can select the credit card and shipping address. In FIG. 5, the image 180 and the image 182 both identify the same credit card, but provide different shipping addresses. The user's home address is associated with the image 180 while the user's office address is associated with the image 182. In contrast, the image 184 identifies a different credit card and shipping address combination. Thus, the user can select the desired credit card and the desired shipping address merely by capturing the appropriate image.

The captured image is transmitted to the authentication processor 110 for analysis in the manner described above. In this embodiment, a match not only authenticates the identity of the user, but also indicates user selection of parameters, such as credit card and shipping address. In other embodiments, multiple images could reflect other user-selectable parameters. For example, if the web server 116 provides access to a private network, as described above, multiple images, such as those illustrated in FIG. 5, could be used to select different servers, application programs, or the like within the local area network. One server within the private network could store documents, while another server within the private network stores financial data. By selecting the appropriate image, the user can navigate to a particular location within the private network.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system to verify user identity on a computing device having a display and coupled to a computer network, comprising:
   an authentication server coupled to the computer network;
   a data storage area communicatively coupled to the authentication server and configured to store an image, the stored image having no embedded information;
   a network interface controller associated with the authentication server and configured to control communications with the computer network wherein the authentication server is configured to transmit the stored image to the computing device, using the computer network, to thereby display the image on the display;
   a mobile communication device having an image capture device and configured to capture the displayed image and thereby generate a captured image;

a transmitter associated with the mobile communication device to transmit the captured image, in an unprocessed form, to the authentication server using a public mobile communication network; and an image analyzer associated with the authentication server and configured to compare the captured image and the stored image without any analysis of embedded information, to thereby verify user identity if the comparison indicates that the captured image matches the stored image.

2. The system of claim 1 wherein the authentication server is further configured to select the image from a plurality of images stored in the data storage area.

3. The system of claim 1 wherein the authentication server is further configured to generate the image.

4. The system of claim 1 wherein the image is stored in the data storage area in association with the mobile communication device.

5. The system of claim 4 wherein the image is stored in the data storage area in association with a subscriber identity value for the mobile communication device.

6. The system of claim 1 wherein the data storage area stores a plurality of images, the system further comprising a user-operable selection device to select the image from the plurality of stored images wherein the stored image transmitted to the computing device and displayed on the display is the user-selected image.

7. The system of claim 1, further comprising a web server communicatively coupled to the computing device via the computer network wherein a user attempt to access the web server using the computer triggers a request from the web server to the authentication server to verify user identity.

8. The system of claim 7 wherein the authentication processor transmits a match indication to the web server if the comparison indicates that the captured image matches the stored image, to thereby permit the computing device to access the web server.

9. The system of claim 7 wherein the authentication processor transmits a no-match indication to the web server if the comparison indicates that the captured image does not match the stored image, to thereby deny the computing device access to the web server.

10. The system of claim 7 wherein the web server is configured to provide a webpage to the computing device wherein the webpage provides a link to the image stored in the data storage area to thereby permit the computing device to render the image on the display.

11. The system of claim 1 wherein the authentication server is configured to transmit a plurality of stored images to the computing device, using the computer network, to thereby display the plurality of images on the display wherein each of the plurality of displayed images corresponds to a different function and one of the different functions is selected by the image capture device capturing the corresponding displayed image.

12. The system of claim 11, further comprising a link to each of the plurality of stored images to thereby permit the computing device to use the plurality of links to render each of the plurality of images on the display.

13. The system of claim 11, further comprising a web server communicatively coupled to the computer via the computer network, the web server being configured to execute a selected function based the image capture device capturing the corresponding displayed image.

14. The system of claim 13 wherein the different functions correspond to different shipping destinations and the web server is further configured to select one of the different shipping destinations based on the selected image captured by the image capture device.

15. The system of claim 13 wherein the different functions correspond to different financial accounts and the web server is further configured to select one of the different financial accounts based on the selected image captured by the image capture device.

16. The system of claim 1 wherein the authentication server is configured to transmit a plurality of stored images to the computing device to thereby display the plurality of images on the computer display wherein each of the plurality of displayed images corresponds to a different function and one of the different functions is selected by the image capture device capturing the corresponding displayed image.

17. The system of claim 16 wherein the web server is configured to provide a webpage to the computing device and the webpage provides a link to the plurality of stored images to thereby permit the computing device to render the plurality of images on the computer display.

18. A system to verify user identity using a wireless communication device having an imaging device and coupled to a wireless communication network, comprising:

a web server coupled to a computer network;
an authentication server communicatively coupled to the web server;
a data storage area communicatively coupled to the server and configured to store an image, the stored image having no embedded information;
a computing device coupled to the computer network and configured to communicate with the web server via the computer network wherein the computing device is configured to request access to the web server; and
a computer display operatively coupled to the computing device to display images;
wherein the web server is configured to request an image from the authentication server upon receipt of an access request from the computing device and the authentication server is configured to provide the stored image for display on the computer display in response to the request for an image to thereby permit the wireless communication device to capture the displayed image using the imaging device and to transmit the captured image, in an unprocessed form, to the authentication server using the wireless communication network;
wherein the authentication server is further configured to compare the captured image and the stored image to determine if there is a match based solely on a comparison of the captured image and the stored image without any analysis of embedded information in the captured image, the authentication server sending a message to the web server to indicate whether or not there is a match between the captured image and the stored image.

19. The system of claim 18 wherein the authentication server is coupled to the computer network and is configured to communicate with the web server using the computer network.

20. The system of claim 18 wherein the authentication server is coupled to the web server via a local area network (LAN) and is configured to communicate with the web server using the LAN.

21. The system of claim 18 wherein the authentication server is implemented as a portion of the web.

22. The system of claim 18 wherein the authentication server is further configured to generate the image in response to the request for an image.

23. The system of claim 22 wherein the generated image is stored in the data storage area in association with the mobile communication device.

24. The system of claim 18 wherein the data storage area is configured to store a plurality of images, and the authentication server is further configured to select one of the plurality of stored images in response to the request for an image.

25. The system of claim 18 wherein the web server is configured to permit access to the web server by the computing device in response to receiving the message from the authentication server indicating there is a match between the captured image and the stored image or to deny access to the web server by the computing device in response to receiving the message from the authentication server indicating there is a no match between the captured image and the stored image.

26. The system of claim 18 wherein the web server is configured to provide a webpage to the computing device and the webpage provides a link to the stored image to thereby permit the computing device to render the image on the display.

27. A method for the verification of user identity using a wireless communication device having an imaging device and coupled to a wireless communication network, comprising:
receiving an access request from a computing device at a web server coupled to a computer network;
providing an original image with no embedded information for display on the computing device;
receiving a captured image of the displayed image captured by the imaging device on the wireless communication device and forwarded from the wireless communication device via the wireless communication network;
comparing the original image with the captured image received from the wireless communication device to determine if they match wherein the comparison is based solely on the original image and the captured image and not on the basis of any information embedded in the images; and
sending a message to the web server to indicate whether or not there is a match between the original image and the captured image.

28. The method of claim 27, further comprising generating an image wherein providing the original image for display on the computing device comprises providing the generated image for display on the computing device.

29. The method of claim 27, further comprising storing the image in a storage area wherein providing the original image for display on the computing device comprises providing the stored image for display on the computing device.

30. The method of claim 29, further comprising storing the original image in the storage area in association with the wireless communication device.

31. The method of claim 27 wherein receiving the access request from the computing device comprises receiving a user identity value that is associated with the wireless communication device.

32. The method of claim 31 wherein receiving the user identity value associated with the wireless communication device comprises receiving a user name, the method further comprising using the user name to identify the wireless communication device.

33. The method of claim 27 wherein receiving the access request from the computing device comprises receiving the access request at a web page provided by the web server and wherein providing the original image for display on the computing device comprises providing a link to the original image on the web page to thereby permit the computing device to render the original image on the display of the computing device.

34. The method of claim 27 wherein providing the original image for display on the computing device comprises providing a plurality of original images for display on the computing device.

35. The system of claim 34 wherein the web server is configured to provide a webpage to the computing device and the webpage provides a link to the plurality of original images to thereby permit the computing device to render the plurality of original images on the computer display.

36. The method of claim 27, further comprising generating a timestamp indicative of a time when the original image is provided for display on the computing device.

37. The method of claim 36 wherein receiving the captured image of the displayed image captured by the imaging device on the wireless communication device comprises receiving a timestamp indicative of a time at which the displayed image was captured, the method further comprising comparing the timestamp for the time when the original image is provided for display on the computing device with the timestamp for the captured image to determine a time difference between the timestamps.

38. The method of claim 37, further comprising sending an access denial message to the web server if the time difference between the timestamps is greater than a threshold time difference.

* * * * *